(12) United States Patent
Goodall

(10) Patent No.: US 10,755,611 B1
(45) Date of Patent: Aug. 25, 2020

(54) IMAGE SYSTEM AND METHOD FOR MAKING AN IMAGE SYSTEM

(71) Applicant: Mark Donald Goodall, Vaucluse (AU)

(72) Inventor: Mark Donald Goodall, Vaucluse (AU)

(73) Assignee: JAPELOCO PTY LTD., Sydney, NSW (AU)

( * ) Notice: Subject to any disclaimer, the term of this patent is extended or adjusted under 35 U.S.C. 154(b) by 0 days.

(21) Appl. No.: 16/427,123

(22) Filed: May 30, 2019

(51) Int. Cl.
| | | |
|---|---|---|
| *G09F 15/00* | (2006.01) | |
| *B41M 1/30* | (2006.01) | |
| *B29C 51/26* | (2006.01) | |
| *B29L 31/00* | (2006.01) | |
| *B29K 101/12* | (2006.01) | |
| *A47G 1/06* | (2006.01) | |

(52) U.S. Cl.
CPC ........ *G09F 15/0018* (2013.01); *B29C 51/264* (2013.01); *B41M 1/30* (2013.01); *A47G 1/065* (2013.01); *A47G 1/0633* (2013.01); *B29C 2795/002* (2013.01); *B29K 2101/12* (2013.01); *B29L 2031/723* (2013.01)

(58) Field of Classification Search
CPC .... A47G 1/0633; A47G 1/065; B29C 51/264; B29C 2795/002; B41M 1/30
See application file for complete search history.

(56) References Cited

U.S. PATENT DOCUMENTS

| | | | | |
|---|---|---|---|---|
| 4,782,611 A | * | 11/1988 | Papov | ................. A47G 1/0633 40/768 |
| 4,885,854 A | | 12/1989 | Brandes | |
| 5,020,251 A | * | 6/1991 | Cheng | ................... A47G 1/065 40/735 |
| 5,359,794 A | | 11/1994 | Wood | |
| 5,678,339 A | | 10/1997 | Marventano | |
| 9,462,898 B1 | * | 10/2016 | Finnell | ................ A47G 1/0633 |
| 2005/0039366 A1 | | 2/2005 | Peck | |
| 2009/0013577 A1 | * | 1/2009 | Barnard | ................ A47G 1/065 40/731 |
| 2012/0297653 A1 | | 11/2012 | Ridless et al. | |
| 2013/0219761 A1 | * | 8/2013 | Edmondson | ......... A47G 1/0633 40/743 |
| 2013/0227868 A1 | * | 9/2013 | Edmondson | ......... A47G 1/0633 40/743 |
| 2015/0265072 A1 | | 9/2015 | Ridless et al. | |
| 2017/0172325 A1 | | 6/2017 | Greene | |

FOREIGN PATENT DOCUMENTS

GB 2447918 A 10/2008

\* cited by examiner

*Primary Examiner* — Gary C Hoge

(57) ABSTRACT

An image system can comprise a sheet of clear thermoplastic material formed to define an interior space configured for disposal of an image or a three-dimensional object. The sheet can comprise a substrate upon which an image can be directly printed or otherwise attached. The image system can comprise two or more panes that meet at a vertex along a corner or are oriented at an angle relative to one another. The vertex can be formed using a tool in combination with selective heating and cooling of the thermoplastic material. The image can extend across at least two of the panes. The image system can comprise a mount configured to deter theft or tampering. Connectors can be utilized to connect two or more image systems to one another.

20 Claims, 7 Drawing Sheets

IMAGE SYSTEM AND METHOD FOR MAKING AN IMAGE SYSTEM

TECHNICAL FIELD

Embodiments of the technology relate generally to images and more particularly to methods and systems for housing and presentation of images and three-dimensional objects.

BACKGROUND

Conventional technologies underserve many aspects of housing and presenting images and three-dimensional objects. Need exists for fabrication capabilities that offer improvements relating to expediency, timeliness, rapid delivery, material waste, environmental impact, efficiency, labor, convenience, and/or economics. Need further exists for configurations and architectures that offer improvements relating to integration, material cost, waste, strength, stability, and/or environmental protection. Need further exists for improved protection against theft or tampering. Need further exists for improved capabilities for creating combinations and arrays and for coordinated mounting. Need further exists for extending an image between two substrates having different angular orientations. Need further exists for extending an image across a corner. A technology addressing one or more such needs, or some related deficiency in the art, would benefit the field.

SUMMARY

An image system can support housing, enclosing, protecting, mounting, presenting, and/or displaying one or more images or one or more three-dimensional objects, such as a commercial product, a mechanism or machine, or an archeological artifact, to name a few representative examples without limitation.

In one aspect of the disclosure, a sheet of clear thermoplastic material can be formed to provide an enclosure for one or more images or three-dimensional objects. The sheet of material can have a perimeter or outline defining a geometrical form, for example a rectangle, a hexagon, or a polygon. One or more strip-shaped areas of the material extending along at least a portion of the perimeter can be turned up to form a corner between the strip-shaped area(s) and a central area of the sheet. The corner may be sharp or rounded and may provide a perpendicular angle or an angle that is acute or obtuse. The material can be heated to facilitate forming the corner and cooled to fix the corner and set it into position. A tool comprising an edge or a corresponding a corner can be utilized to help form the corner in the material. The turned-up strip and the central portion of the sheet can define an interior space that is at least partially enclosed. One or more images or objects can be disposed in the space. In some examples, an interior surface of the formed sheet can serve as a substrate for an image, or features or elements can be attached to or embedded in the sheet.

In a further aspect of the disclosure, a groove can be provided on a surface of a sheet of clear thermoplastic material that provides a substrate for an image. An image to be applied to the sheet can be divided into two image portions. One image portion can be applied to one side of the groove, and the other image portion can be applied to the other side of the groove, so that the groove separates the two image portions. The sheet can be formed to provide a corner extending lengthwise along the groove, for example so forming the corner closes the groove. Thus, the sheet can be transformed from have a planar geometry to having an angle with a vertex disposed at the groove. When the angle is formed and the groove closes, the separation between the two image portions can be reduced or eliminated. Accordingly, the two image portions can be merged or joined. Forming the angle and closing the groove can be viewed as splicing the image portions.

In a further aspect of the disclosure, an image system can comprise at least one front-oriented pane and at least one side-oriented pane. An image can extend across at least two of the panes. In some examples, the image system can comprise two or more front-oriented panes that are substantially coplanar. In some examples, two or more front-oriented panes can meet to define a vertex. The front-oriented panes can form a three-sided pyramid, a four-sided pyramid, a prism, a form with faces angled like the two sides of a pitched roof, or another appropriate geometric form, to mention a few representative examples without limitation.

In a further aspect of the disclosure, a connector can connect two image systems to one another. The combination can be extended by using more connectors to add more image systems, for example to provide an arbitrarily sized one- or two-dimensional array of image systems.

In a further aspect of the disclosure, an image system can comprise a system for mounting the image system securely to a surface, for example to deter theft or tampering.

The foregoing discussion about image systems is for illustrative purposes only. Various aspects of the present disclosure may be more clearly understood and appreciated from a review of the following text and by reference to the associated drawings and the claims that follow. Other aspects, systems, methods, features, advantages, and objects of the present disclosure will become apparent to those with skill in the art upon examination of the following drawings and text. It is intended that all such aspects, systems, methods, features, advantages, and objects are to be included within this description and covered by this paper and by the appended claims.

BRIEF DESCRIPTION OF THE FIGURES

FIG. 1, are perspective illustrations of an image system in accordance with some example embodiments of the disclosure.

FIG. 2, are illustrations that describe fabricating an image system in accordance with some example embodiments of the disclosure.

FIG. 3, are illustrations depicting forming a corner in an image system in accordance with some example embodiments of the disclosure.

FIG. 4, are illustrations of an image system and an image system blank in accordance with some example embodiments of the disclosure.

FIG. 5, are illustrations of an image system and an image system blank in accordance with some example embodiments of the disclosure.

FIG. 6, are side and overhead illustrations of a connector for connecting image systems to one another in accordance with some example embodiments of the disclosure.

FIG. 9, are illustrations of portions of an image system comprising secure mounting apertures in accordance with some example embodiments of the disclosure.

FIG. 10, are illustrations of portions of an image system comprising secure mounting apertures in accordance with some example embodiments of the disclosure.

Figure 1A:
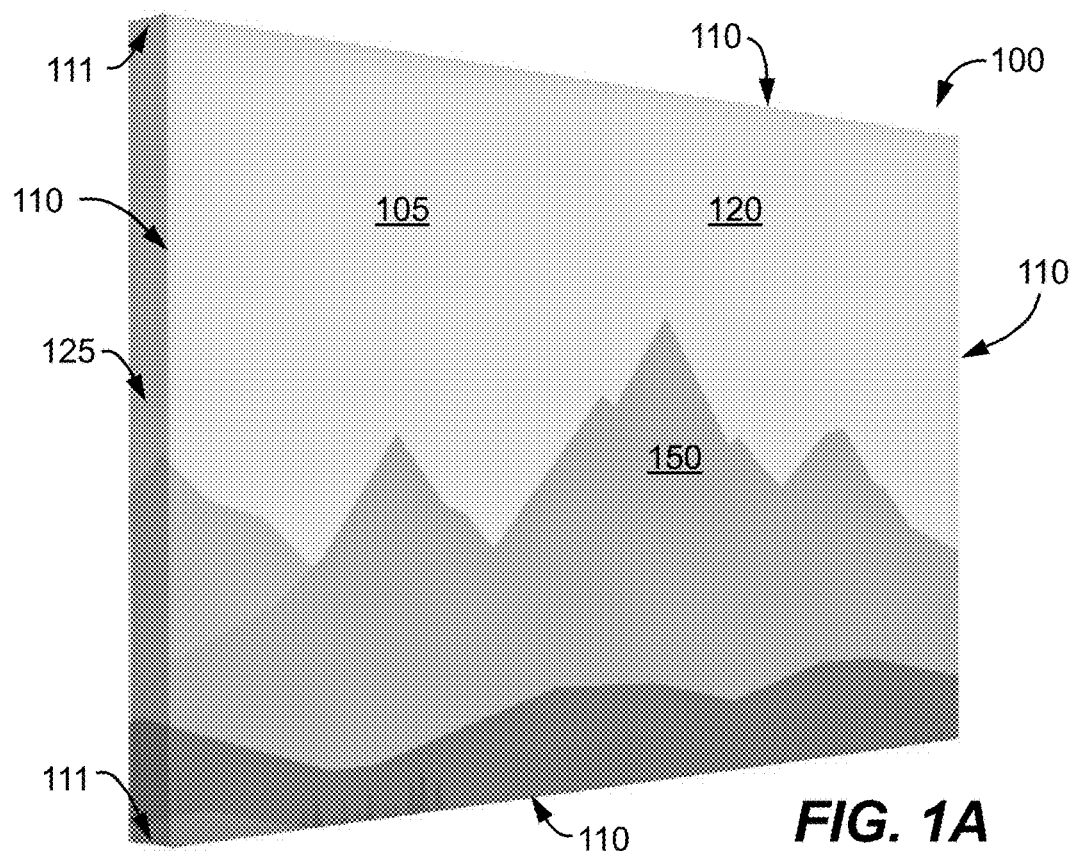
FIGS. 1A and 1B, collectively

Many aspects of the disclosure can be better understood with reference to these figures. The elements and features shown in the figures are not necessarily to scale, emphasis being placed upon clearly illustrating principles of example embodiments of the disclosure. Moreover, certain dimensions may be exaggerated to help visually convey such principles. In the figures, reference numerals often designate like or corresponding, but not necessarily identical, elements throughout the several views.

DETAILED DESCRIPTION OF EXAMPLE EMBODIMENTS

The technology will be discussed more fully hereinafter with reference to the figures, which provide additional information regarding representative or illustrative embodiments of the disclosure. The present technology can be embodied in many different forms and should not be construed as limited to the embodiments set forth herein; rather, these embodiments are provided so that this disclosure will be thorough and complete, and will fully convey the scope of the technology to those having ordinary skill in the art. Furthermore, all "examples," "embodiments," and "exemplary embodiments" provided herein are intended to be non-limiting and among others supported by representations of the disclosure.

Those of ordinary skill in the art having benefit of this disclosure will be able, without undue experimentation, to combine compatible elements and features that are described at various places in this written description, which includes text and illustrations. That is, the illustrations and specification are organized to facilitate practicing numerous combinations, such as by combining an element of one illustrated embodiment with another element of another illustrated embodiment or by combining a feature disclosed in an early paragraph of the specification with another element disclosed in a later paragraph of the specification.

This document includes sentences, paragraphs, and passages (some of which might be viewed as lists) disclosing alternative components, elements, features, functionalities, usages, operations, steps, etc. for various embodiments of the disclosure. Unless clearly stated otherwise, all such lists, sentences, paragraphs, passages, and other text are not exhaustive, are not limiting, are provided in the context of describing representative examples and variations, and are among others supported by various embodiments of the disclosure. Accordingly, those of ordinary skill in the art having benefit of this disclosure will appreciate that the disclosure is not constrained by any such lists, examples, or alternatives. Moreover, the inclusion of lists, examples, embodiments, and the like (where provided as deemed beneficial to the reader) may help guide those of ordinary skill in practicing many more implementations and instances that embody the technology without undue experimentation, all of which are intended to be within the scope of the claims.

This disclosure includes figures and discussion in which features and elements of certain embodiments may be organized into what might be characterized as functional units, blocks, subsystems, or modules. And, certain processes and methods may be organized into blocks or into steps. Such organization is intended to enhance readership and to facilitate teaching the reader about working principles of the technology and about making and using an abundance of embodiments of the disclosure. The organization is not intended to force any rigid divisions or partitions that would limit the disclosure. In practice, the flexibility of the technology and the depth of this disclosure supports dispersing or grouping functionalities, elements, and features in many different ways. The inclusion of an element or function in one block, unit, module, or subsystem verses another may be substantially arbitrary in many instances, with the divisions being soft and readily redrawn using ordinary skill in combination with this rich teaching. Accordingly, functional blocks, modules, subsystems, units, and the like can be combined, divided, repartitioned, redrawn, moved, reorganized, or otherwise altered without deviating from the scope and spirit of the disclosure. This is not to say that, nor will it support a conclusion that, any disclosed organizations and combinations are not novel, are not innovative, or are obvious.

Certain steps in the processes and methods disclosed or taught herein, may naturally need to precede others to achieve desirable functionality. However, the disclosure is not limited to the order of the described steps if such order or sequence does not adversely alter functionality to the extent of rendering the technology inoperable or nonsensical. That is, it is recognized that some steps of a process or method may be performed before or after other steps or in parallel with other steps without departing from the scope and spirit of the disclosure.

In some instances, a process or method (for example of using, making, or practicing) may be discussed with reference to a particular illustrated embodiment, application, or environment. For example, a flowchart may reference or be discussed with reference to a figure. Those of skill in the art will appreciate that any such references are by example and are provided without limitation. Accordingly, the disclosed processes and methods can be practiced with other appropriate embodiments supported by the present disclosure and in other appropriate applications and environments. Moreover, one of ordinary skill in the art having benefit of this disclosure will be able to practice many variations of the disclosed and flowcharted methods and processes as may be appropriate for various applications and embodiments.

The term "fasten," as used herein, generally refers to physically coupling something to something else firmly or securely.

The term "fastener," as may be used herein, generally refers to an apparatus or system that fastens something to something else, whether releasably, temporarily, or permanently.

The term "connector," as used herein, generally refers to an apparatus or system that connects something with something else.

The term "couple," as may be used herein, generally refers to joining, connecting, or associating something with something else.

As one of ordinary skill in the art will appreciate, the term "operably coupled," as may be used herein, encompasses direct coupling and indirect coupling via another, intervening component, element, or module; moreover, a first component may be operably coupled to a second component when the first component comprises the second component.

As one of ordinary skill in the art will appreciate, the term "approximately," as may be used herein, provides an industry-accepted tolerance for the corresponding term it modifies. Similarly, the term "substantially," as may be used herein, provides an industry-accepted tolerance for the corresponding term it modifies. Such industry-accepted tolerances range from less than one percent to twenty percent and correspond to, but are not limited to, component values, process variations, and manufacturing tolerance.

As appreciated by those of skill in the art, unless clearly specified otherwise, the values provided herein are intended to reflect commercial design practices or nominal manufacturing targets. For example, what may be described or specified as a 90-degree angle, may deviate from 90 degrees when implemented in a commercial product due to fabrication error, warpage, and customary tolerances.

Figure 1B:
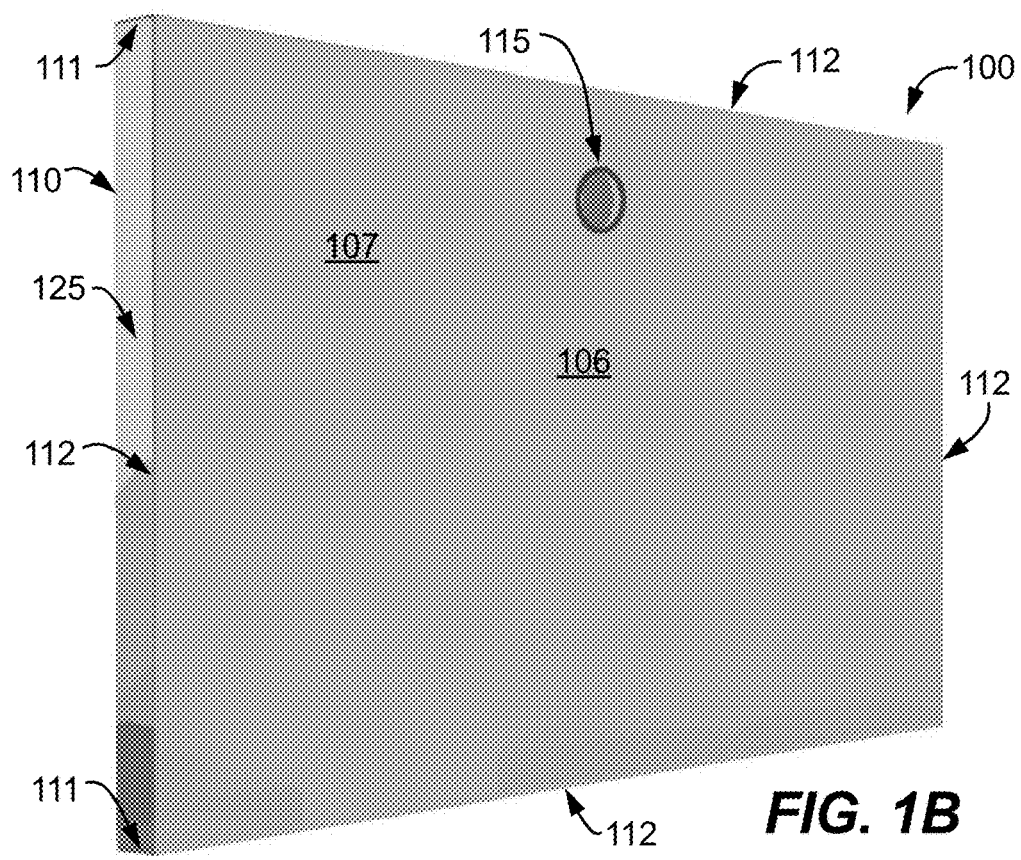
Figure 2A:
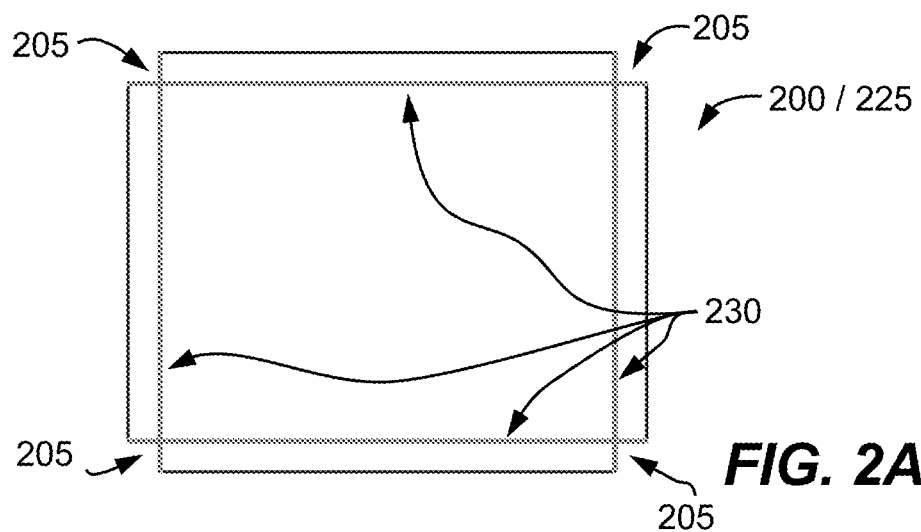
FIGS. 2A, 2B, 2C, 2D, and 2E, collectively
Figure 2B:
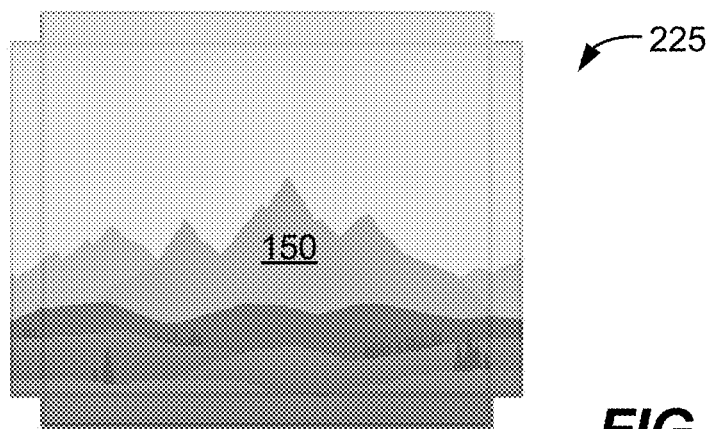
Figure 2C:
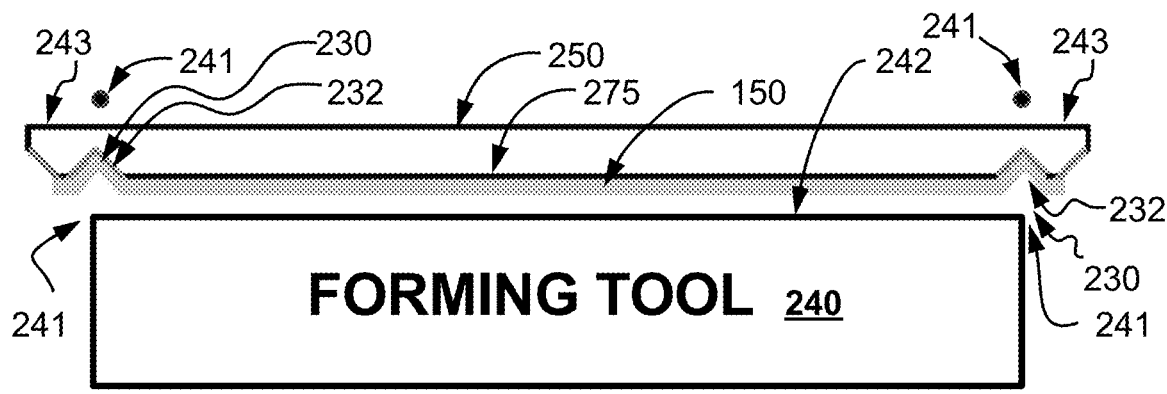
Figure 2D:
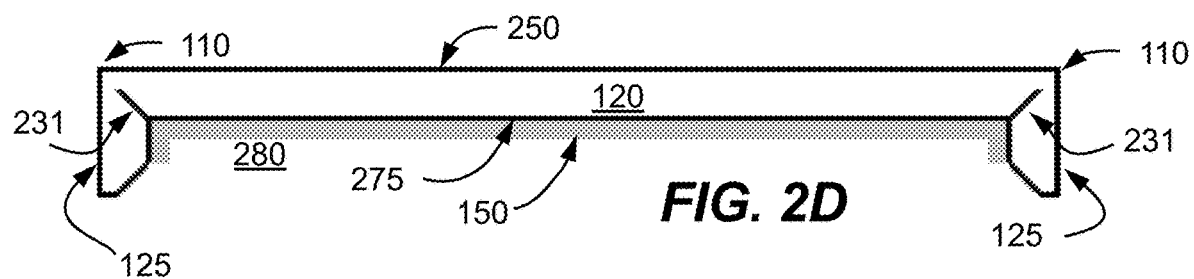
Figure 2E:
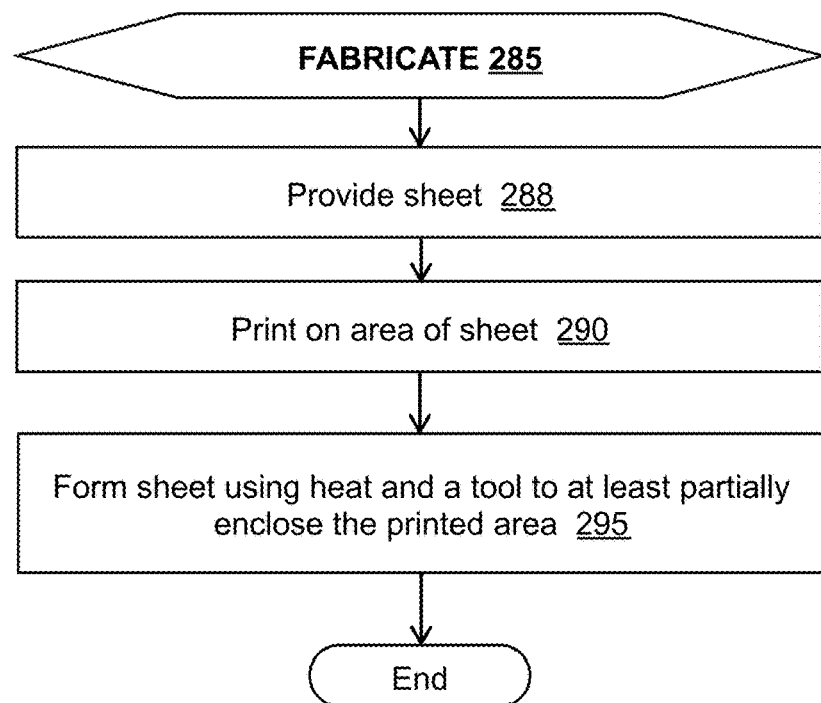
Figure 3A:
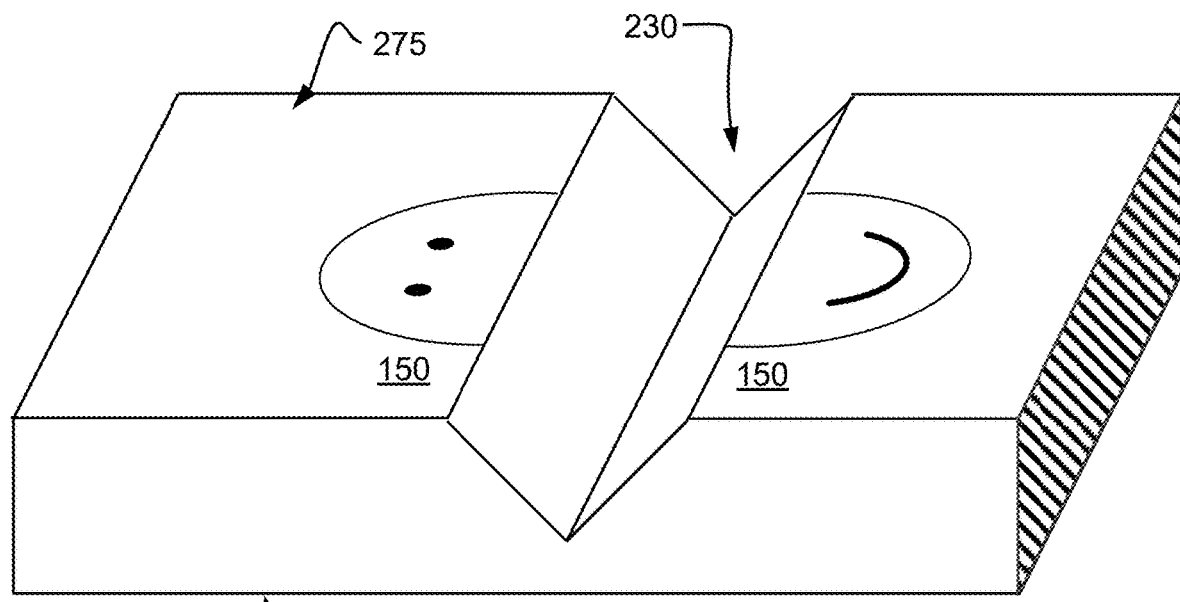
FIGS. 3A and 3B, collectively
Figure 3B:
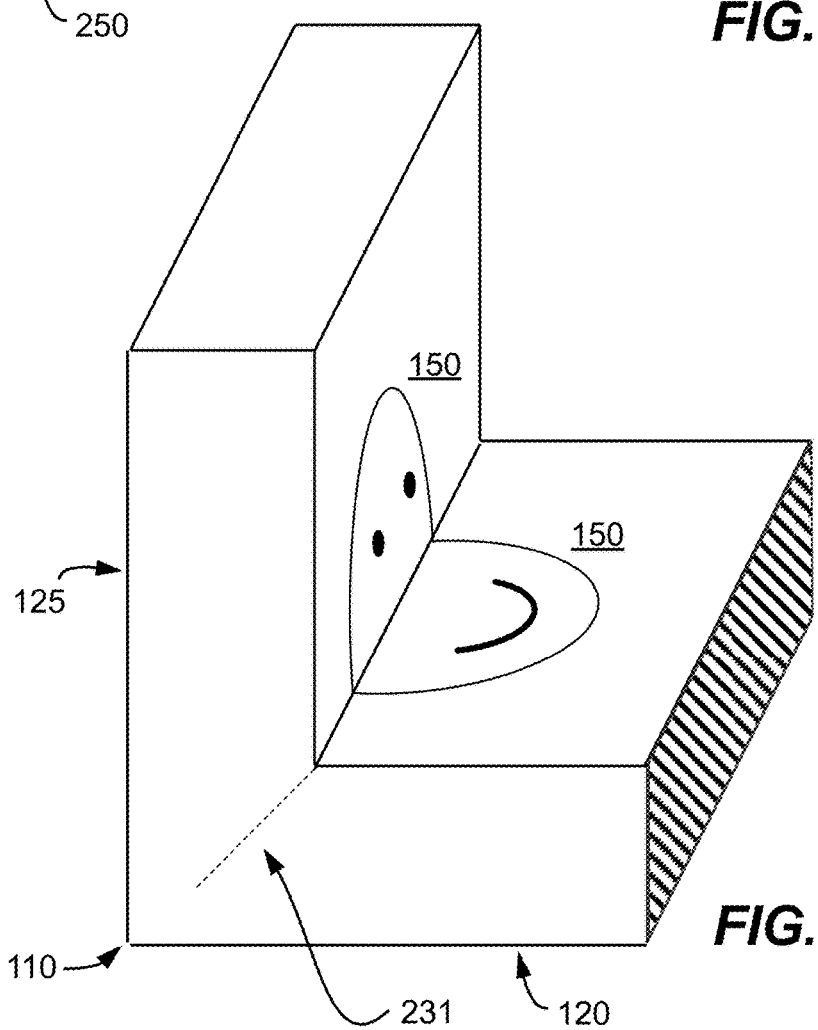

Turning now to FIGS. 1, 2, and 3, these figures will be discussed. FIGS. 1A and 1B illustrate perspective views of an example image system 100 according to some embodiments of the disclosure. FIG. 1A illustrates a front perspective view of the image system 100 in which a front 105 of the image system 100 is prominent. FIG. 1B, meanwhile, illustrates a rear perspective view of the image system 100 in which a rear 106 of the image system 100 is prominent. FIGS. 2A, 2B, 2C, 2D, and 2E illustrate example stages of and an example flowchart for a representative process 285 for fabricating the image system 100 from a sheet 200 of clear thermoplastic material according to some embodiments of the disclosure. FIGS. 3A and 3B illustrate forming an example front corner 110 in the image system 100 according to some embodiments of the disclosure.

As best seen in FIGS. 1A and 1B, in this illustrated example, the image system 100 is rectangular in form and comprises a front pane 120 and four side panes 125 extending rearward from a perimeter of the front pane 120. The front pane 120 and the side panes 125 meet to form a front corner 110. The front corner 110, like other corners disclosed herein, may be rounded, beveled, chamfered, or otherwise contoured. In this example, an image 150 extends from the front pane 120 to the side pane 125, including across the front corner 110.

As illustrated, adjacent side panes 120 meet at side corners 111, which extend from the front corner 110 rearward to a rear corner 112. In the rectangular geometry of the illustrated image system 100, the side corners 111 have included angles (i.e., interior angles) of approximately 90 degrees.

Other embodiments may have different angles. For example, the side corners 111 may have angles of 60 degrees for an image system (not illustrated) with an equilateral triangular geometry or 120 degrees for a hexagonal geometry with six side panes 125 (see FIG. 8 discussed below). In some embodiments, the side corners 111 of an image system (not illustrated) have different included angles with correspondingly different side panes lengths. For example, an image system (not illustrated) having a right-triangle outline may have three corners 111 with angles of 30, 60, and 90 degrees and three side panes 125 of correspondingly different lengths.

In the illustrated embodiment of FIG. 1, the front pane 120 and side panes 125 are disposed perpendicular to one another so the front corner 110 represents a vertex with an included angle of 90 degrees. Other embodiments may have different angles. Accordingly, example forms of the front corner 110 may be obtuse (at various degrees) or acute (at various degrees) relative to the illustrated embodiment.

Some example embodiments may have more than one front pane 120. For example, for the embodiment illustrated at FIG. 1, the front pane 120 may be divided into multiple panes (not illustrated), such as four panes of equal size that are coplanar or lie in a common plane.

As discussed above, in one alternative embodiment, an image system (not illustrated) has an outline in the geometric form of an equilateral triangle. In such an embodiment, a respective side pane can be disposed at each of the three triangle's sides, so that the image system has three side panes. In one embodiment, the front of this image system can have a single pane that fills the area within the equilateral triangle. In another embodiment of this image system, the front of the image system can be divided into multiple panes within the equilateral triangle, each oriented at a different angle. For example, in one such embodiment, the area inside the equilateral triangle is divided into three panes that form a three-sided pyramid projecting frontward in three dimensions to a centrally disposed vertex. In such an embodiment, the front corner 110 can have an included angle that is greater than 90 degrees, with that angle defining the extent of forward projection of the pyramid.

Figure 5A:
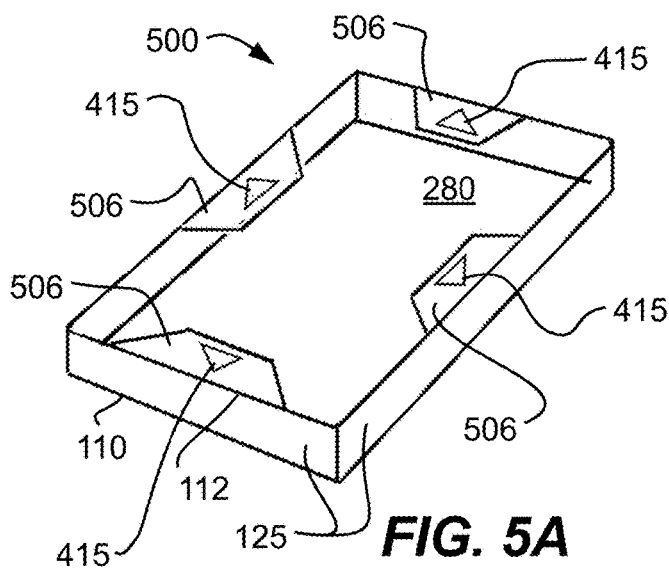
FIGS. 5A and 5B, collectively

As best seen in FIG. 1B, in this illustrated example, the rear 106 of the image system 100 comprises a rear pane 107 that extends fully between the side panes 125. The rear pane 107 and the side panes 125 meet at the rear corner 112, which is illustrated as perpendicular but may have another geometry as appropriate. As illustrated, the rear pane 107 is opaque and comprises an aperture 115 for hanging the image system 100 on a nail in a wall or other appropriate mounting. In other embodiments, the rear pane 107 may be clear and may not fully extend between the side panes 125, for example as illustrated in FIG. 5A as discussed below.

As illustrated at FIG. 2, an example process 285 for fabricating the image system 100 will be discussed. FIG. 2E illustrates an example flowchart for the process 285, while FIGS. 2A, 2B, 2C, and 2D illustrate example stages or intermediates of fabrication.

In the example fabrication process of FIG. 2, the image system 100 can be fabricated from a blank 225 that comprises a sheet 200 of clear thermoplastic material. The sheet 200 is provided at block 288 of the process flowchart illustrated by FIG. 2E. The clear thermoplastic material can comprise polymethyl methacrylate (PMMA) (acrylic), polycarbonate, or other appropriate rigid plastic material. As will be appreciated by those of skill in the art, the plastics industry uses "rigid plastic" to refer to a recognized category of plastics, which includes PMMA and polycarbonate. In the illustrated embodiment, the clear thermoplastic material has sufficient rigidity for the image system 100 to hold its shape. In some example embodiments, the clear thermoplastic material of the sheet 200 comprises an additive that absorbs ultraviolet (UV) light to protect the image 150 from UV degradation.

In some example embodiments, the sheet 200 comprises a laminate with at least one layer comprising a clear thermoplastic material. In some example embodiments, the sheet 200 comprises an anti-reflective layer or material coating that is operative to reduce glare, provide a tint, or impart another desired optical, physical, or chemical property.

In some example embodiments, the sheet 200 has a thickness in the range of 2 mm to 7 mm. In other example embodiments, the sheet 200 may be thinner or thicker as may be desirable for various applications. In some applications, it may be appropriate to use a plastic that is semi rigid or to use a non-rigid plastic.

As illustrated at FIG. 2B and at block 290 of the flowchart of FIG. 2E, the image 150 is printed on the blank 225 in this example. As illustrated, the image 150 covers the blank 225. In other embodiments, one or more images may be printed on selective areas of the blank 225, for example so that the side panes 125 remain unprinted or are covered with opaque ink or a decorative design or pattern. In some example embodiments, the image 150 consists of text or lettering. For example, the landscape embodiment of the image 150 shown in FIG. 1, could be replaced with the word "SALE." The result could be used for an outdoor signage advertisement, for example.

In some example embodiments, a computer printer prints the image 150 directly on the blank 225, for example using a commercially available inkjet printer and printing process, as known in the art. Printing directly on the blank 225 can comprise preparing the surface 225 of the blank 225 to promote adhesion of ink to the blank 225. If, for example, the blank 225 is coated with a substance that promotes ink adhesion and then the ink is printed on top of the coating, the printing would be considered a form of direct printing on the blank 225.

As illustrated at FIG. 2A, the example blank 225 comprises cutouts 205. As shown on FIGS. 2A and 2C, grooves 230 extend between the cutouts 205. In the illustrated example embodiment, the grooves 230 correspond to the outline of the front pane 120 as illustrated at FIG. 1A.

As illustrated by FIGS. 2C and 2D and as shown in block 295 of the flowchart for process 285, the blank 225 can be transformed from a flat sheet of material into a three-dimensional structure by forming using a forming tool 240. In various example embodiments, the forming tool 240 can comprise one or more molds, jigs, dies, thermoforms, fixtures, or other appropriate fabrication tools that may be manually operated or operated in part or in whole automatically or under computer control.

In the illustrated embodiment, the forming tool 240 has edges 241 corresponding to the front corners 110. As illustrated, the tool edges 241 comprise corners with angles corresponding to the angles of the front corners 110. In some examples, the forming tool 240 has an upper surface 241 with a geometry matching that of the front pane 120 of the image system 100, for example rectangular in the illustrated embodiment. In some example embodiments, the upper surface 240 of the forming tool 241 is dimensioned according to the dimensions of the front pane 120 of the image system 100. For example, for a square front pane (not illustrated) that is 500 mm by 500 mm, the forming tool may be square with 500 mm by 500 mm (or smaller or larger as may be appropriate to promote insertion and removal).

In example operation, the blank 225 with the printed image 150 is positioned over the forming tool 240, with the image 150 facing the forming tool surface 242 as illustrated in FIG. 2C. Heating elements 241 heat the thermoplastic material of the blank 225 selectively along the groove 230, thereby softening the material. The heating elements 241 can comprise one or more wires that extend along the groove 230 and radiate heat in response to transmitting electricity as provided by an electrical source and controller (not illustrated). Once the material of the blank 225 is heated and softened, the edge 241 of the forming tool 240 forms the front corner 110 as illustrated at FIG. 2D. In some embodiments, gravity helps produce the forming. In other embodiments, a tool component (not illustrated) applies force at selective locations 243 to promote corner forming.

Once the front corner 110 is formed, the material of the blank 225 is cooled to set the angle of the corner 110. Such cooling can occur with or without active cooling. Active cooling can be provided via forced flow of cool air or by piping cool water through channels (not illustrated) of the forming tool 240.

As shown in FIG. 2D, the process produces a unitary element comprising the front pane 120 and the side panes 125 in a form that defines an interior space 280. In other words, the process forms the front pane 120 and the side panes 125 in one continuous piece of material. The image 150 is on the interior surface 275 of the front pane, opposite the exterior surface 250 of the front pane 120. Alternatively, the front pane 120 and side panes 125 can be fabricated as separate components and then joined using epoxy, adhesive, or brackets or other appropriate means.

Adjacent side panels 125 can be fused with heat or epoxy or alternatively left unfused at the side corners 111. The rear panel 107 can be added using fusing, epoxy, adhesive, metal fasteners, brackets, or other appropriate fastening methodology known in the art.

As illustrated at FIG. 2D, when the front corner 110 is formed, the groove 230 closes at an interface 231. In some example embodiments, at the interface 231, the thermoplastic material of the blank 225 may fuse so that the interface 231 vanishes or is not visible to an unaided human eye. In the embodiment illustrated at FIG. 2C, a portion 232 of the image is printed in the groove 230. Accordingly, that portion 232 of the image may be embedded in the front corner 110 at the interface 231.

FIG. 3 illustrates another embodiment of forming the front corner 110. As shown in FIG. 3A, the image 150 can be divided into two image portions that are respectively printed on opposite sides of the groove 230, so there is separation between the two image portions. When the corner 110 is formed and the groove 230 closes partially or fully as discussed above, the separation reduces so the image 150 extends contiguously across the corner 110. Thus, the two image portions can effectively merge or join. Forming the angle and closing the groove 230 can be viewed as splicing the image portions. This embodiment can reduce image loss or distortion or can help avoid embedding printing material in the interface 231.

Alternatives to or derivatives of the example forming process illustrated in FIG. 2 are available. For example, in some embodiments, a forming process can comprise vacuum forming, injection molding, 3D printing, or other appropriate means.

Figure 4A:
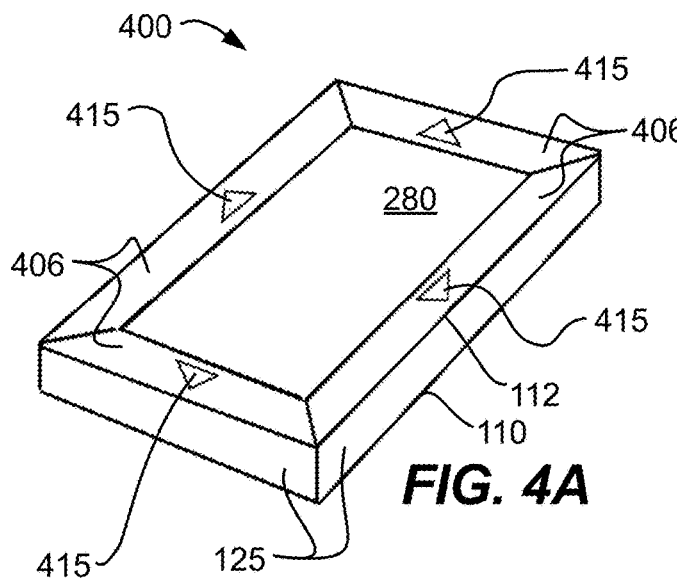
FIGS. 4A and 4B, collectively
Figure 4B:
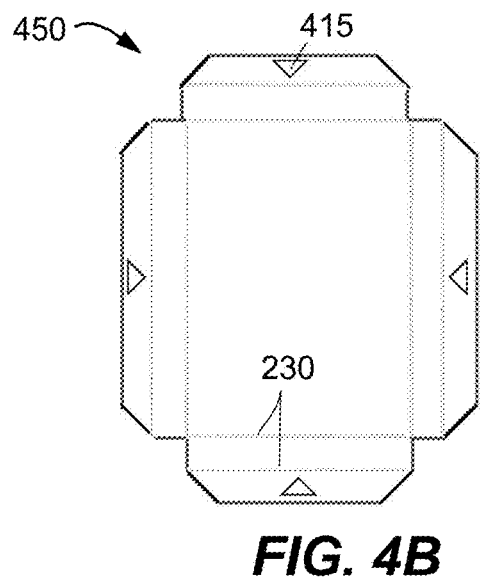

Turning now to FIGS. 4A and 4B, these figures illustrate an example image system 400 and an example image system blank 450 according to some embodiments of the disclosure. In this example embodiment, the blank 450 comprises two grooves 230 that extend lengthwise alongside one another. The two grooves 230 are transformed using heat for material softening and force for material deformation to create a front corner 110 and a rear corner 112 of the image system 400. Side panes 125 extend between the front corner 110 and the rear corner 112. The rear corner 112 provides rear panes 406 that extend partially behind an interior space 280 of the image system 400. In some other embodiments (not illustrated), the rear panes 406 continue and meet one another to fully close the interior space 280. As illustrated, the rear panes 406 comprise apertures 415 that can be used for mounting the image system to a wall or other surface or for connecting to other image systems to form an image system array as will be further discussed below. In some embodiments, the apertures 415 are formed in brackets or other components that are attached to the rear panes 406, for example using screws, epoxy, or adhesive.

Figure 5B:
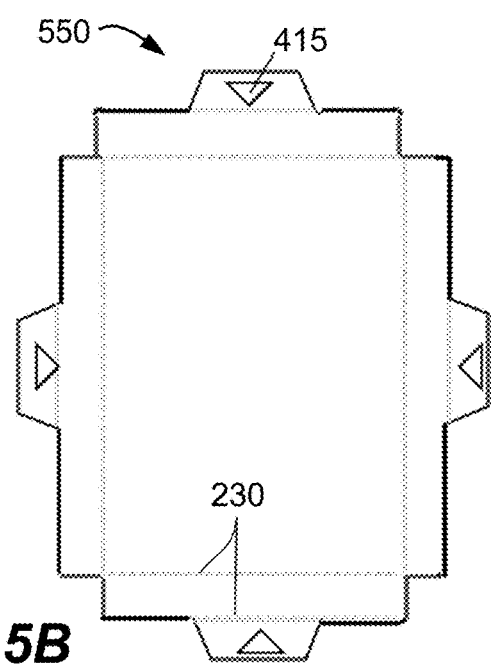

Turning now to FIGS. 5A and 5B, these figures illustrate an example image system 500 and an example image system blank 550 according to some embodiments of the disclosure. FIGS. 5A and 5B are annotated with reference numbers in accordance with the corresponding features of FIGS. 4A and 4B to facilitate applying the foregoing discussion of FIGS. 4A and 4B. In the embodiment of FIGS. 5A and 5B, the rear panes 506 are reduced in size relative to the embodiment of FIGS. 4A and 4B. The size reduction can reduce weight, for example.

Figure 6A:
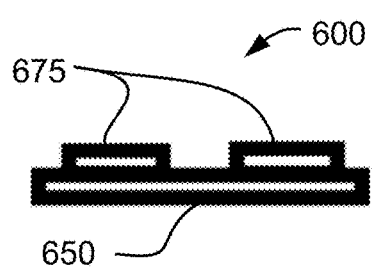
FIGS. 6A and 6B, collectively
Figure 6B:
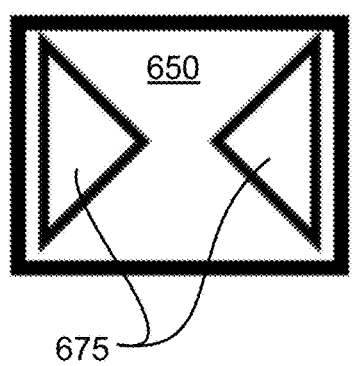
Figure 7:
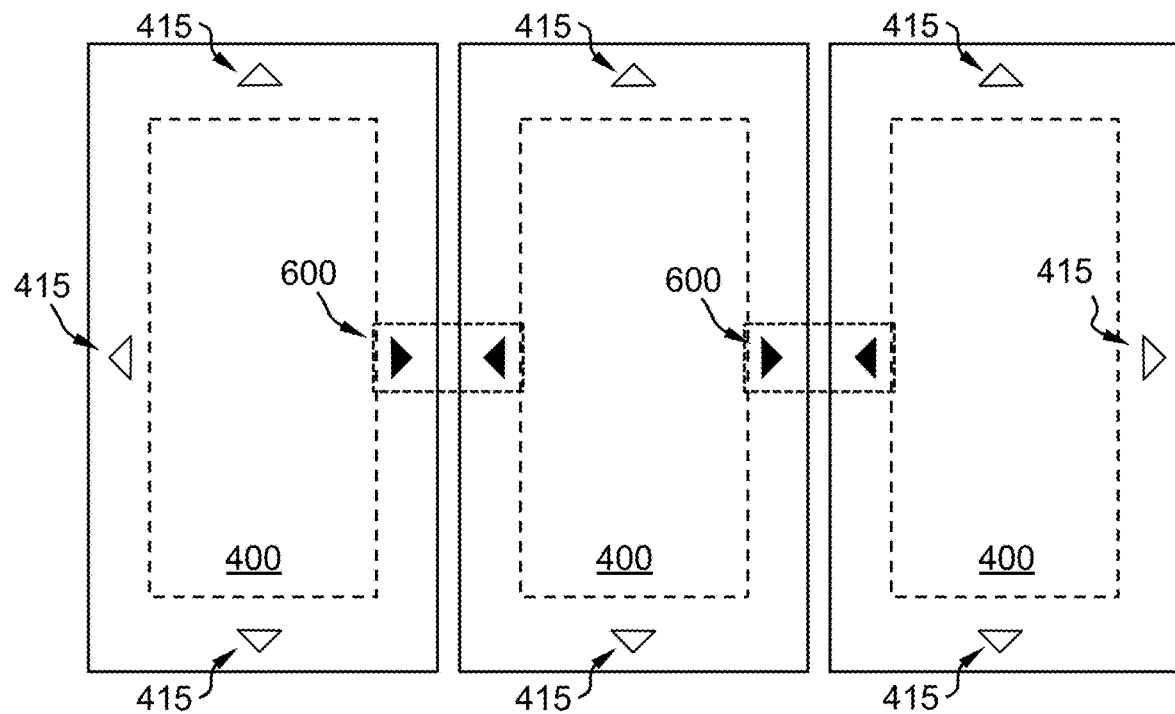
FIG. 7 is an illustration of an array of image systems connected together in accordance with some example embodiments of the disclosure.

Turning now to FIGS. 6 and 7, these figures will be discussed. FIGS. 6A and 6B respectively illustrate side and overhead views of an example connector 600 for connecting image systems 400, 500 to one another according to some embodiments of the disclosure. FIG. 7 illustrates an example array 700 of example image systems 400 connected together according to some embodiments of the disclosure.

In various embodiments, example connectors can comprise a system of connections, fasteners, or couplers with capabilities for connecting, fastening, coupling, or joining, without limitation, and may do so releasably, temporarily, or permanently. In the embodiment illustrated by FIG. 6, the connector 600 comprises two projections 675 that project from opposite ends of a base 650.

As illustrated in FIG. 7, two of the connectors 600 connect together three of the image systems 400 illustrated in FIG. 4, to create an array 700 having a linear or one-dimensional form. In some other example embodiments, adjacent image systems 400 may be connected with four connectors 600, so the illustrated array 700 utilizes four connectors (or some other appropriate number).

As illustrated in FIG. 6, the example projections 675 have a triangular cross section that mates in the apertures 415, with corresponding triangular forms, of the image systems 400. The apertures 415 can comprise receptacles for the projections 675. As illustrated, the projections 675 are sized, shaped, and configured for reception in the apertures 415. The apertures 415 are likewise sized, shaped, and configured to receive the projections 675. The triangular form is one example; other embodiments may be circular, rectangular, or other appropriate geometrical form, without limitation.

In some example embodiments, the connectors 600 are fabricated from a deformable material, such as silicone or another elastomer, to facilitate insertion of oversized projections 675 in the apertures 415. In other embodiments, the connectors 600 may have a metal composition or be molded from acetal or other appropriate thermoplastic. In some example embodiments, the projections 675 are undercut near the base 650 and are otherwise oversized relative to the apertures 415, so that once inserted they are fixed in position.

In some example embodiments, the image systems 400 are connected together to form the array 700, and then the array 700 is mounted on a wall or other appropriate surface. In some example embodiments, the image systems 400 are connected together as each image system 400 is mounted on a wall or other appropriate surface.

As illustrated, the connector 600 and apertures 415 provide a connection system in which the connector 600 comprises male features and the image system 400 comprises female features. In another example embodiments, the connector is female (with apertures) and the image system 400 is male (with projections).

In some example embodiments, one end of the connector 600 is male and the other end is female, and the image systems 400 have male and female features. In such embodiments, the polarity can correspond with an intended orientation. In some other embodiments, some of image systems 400 are exclusively male and others are exclusively female.

Figure 8:
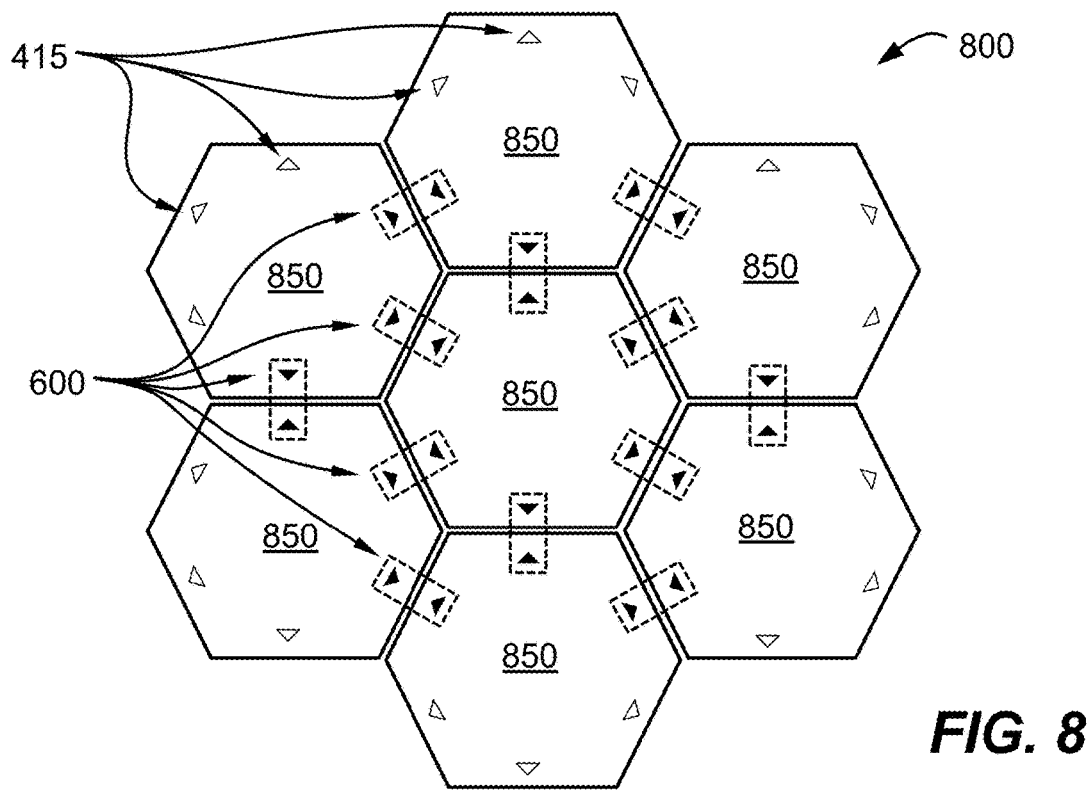
FIG. 8 is an illustration of an array of image systems connected together in accordance with some example embodiments of the disclosure.

Turning now to FIG. 8, this figure illustrates an example array 800 of example image systems 850 connected together according to some embodiments of the disclosure. In the illustrated embodiment of FIG. 8, the image systems 850 are hexagonal and the array 800 extends in two dimensions.

Figure 9A:
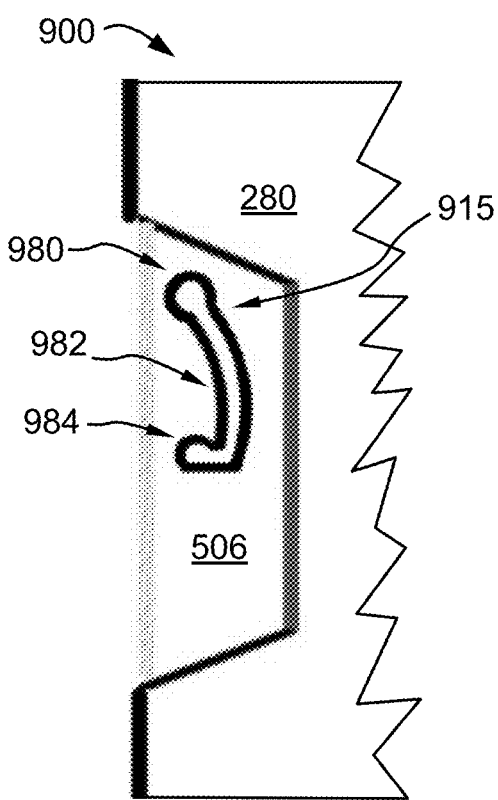
FIGS. 9A and 9B, collectively
Figure 9B:
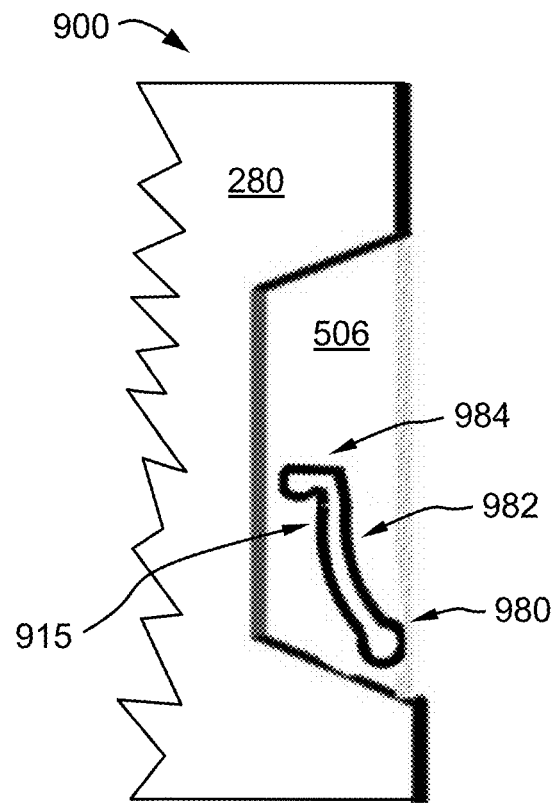

Turning now to FIGS. 9A and 9B, these figures illustrate portions of an image system 900 comprising example secure mounting apertures 915 according to some embodiments of the disclosure. The illustrated portions correspond to the like-numbered features of FIG. 5A. That is, FIGS. 9A and 9B illustrate a variation of the image system 500 illustrated at FIG. 5 in which the triangular apertures 415 shown in FIG. 5 have been replaced with secure mounting apertures 915.

Each secure mounting aperture 915 comprises comprise a curved channel 982 formed in the rear pane 506. As an alternative to forming the curved channel 982 directly in the rear pane 506, the curved channel 982 can be provided in a bracket or other component that is attached to the rear pane 506 using fasteners, epoxy, or other suitable attachment means. As illustrated, the curved channel 982 extends between a large opening 980 and a small opening 984. The large opening 980 is sized to receive a fastener head, while the small opening 984 is sized to preclude passage of the fastener head.

In operation, a user attaches a headed fastener to a wall or other appropriate surface. The headed fastener can comprises a screw or nail, for example. The user then positions the image system 900 against the wall so that the fastener head extends into the large opening 980. The user then moves the image system 900 so that the fastener moves through the channel 982 to the channel end with the small opening 984. The small opening 984 is centered on the rear pane 506 as illustrated. More generally, in some example embodiments, the small opening 984 can be aligned to the center of mass of the image system 900 so that the image system hangs level.

The image system 900 is retained in this position, with the fastener head seated at the small opening 984. Since the small opening 984 is sized to preclude passage of the fastener head, the image system 900 cannot be easily removed from its mounted position on the wall. For non-destructive removal, someone must move the image system 900 so the fastener travels along the channel 982 to the large opening 980. Since someone seeking to steal or tamper with the image system 900 is unlikely to know the removal procedure, the secure mounting aperture 915 helps protect the image system 900.

Figure 10A:
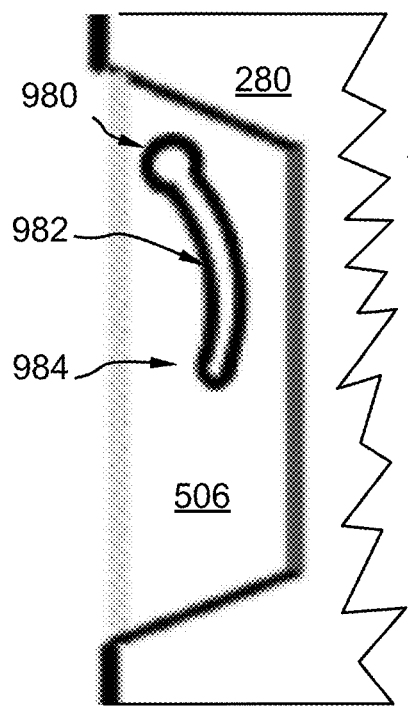
FIGS. 10A and 10B, collectively
Figure 10B:
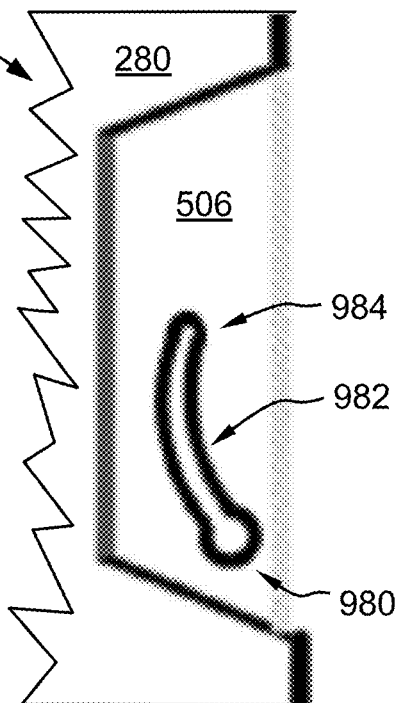

Turning now to FIGS. 10A and 10B, these figures illustrate portions of an image system 1000 comprising example secure mounting apertures 915 according to some embodiments of the disclosure. The illustrated and numbered elements of the example embodiment of FIG. 10 correspond to the like-numbered elements of FIG. 9. The image system 1000 of FIG. 10 mounts and provides security and protection against theft and tampering in keeping with the image system 900 of FIG. 9 and the accompanying discussion.

In the example embodiment of FIG. 10, the secure mounting aperture 915 comprises a large opening 980 to receive the fastener head attached to a mounting surface as discussed above. The secure mounting aperture 915 comprises a curved channel 982 that progressively narrows from the large opening 980 to an opposing, small channel end 984. The channel end 984 provides a long-term mounting location for the fastener as discussed above.

Useful image system technology has been described. From the description, it will be appreciated that an embodiment of the disclosure overcomes limitations of the prior art. Those skilled in the art will appreciate that the technology is not limited to any specifically discussed application or implementation and that the embodiments described herein are illustrative and not restrictive. Furthermore, the particular features, structures, or characteristics that are set forth may be combined in any suitable manner in one or more embodiments based on this disclosure and ordinary skill. Those of ordinary skill having benefit of this disclosure can make, use, and practice a wide range of embodiments via combining the disclosed features and elements in many permutations without undue experimentation and further by combining the disclosed features and elements with what is well known in the art. This disclosure not only includes the illustrated and described embodiments, but also provides a rich and detailed roadmap for creating many additional embodiments using the various disclosed technologies, elements, features, their equivalents, and what is well known in the art. From the description of the example embodiments, equivalents of the elements shown herein will suggest themselves to those skilled in the art, and ways of constructing other embodiments will appear to practitioners of the art. Therefore, the scope of the technology is to be limited only by the appended claims.

What is claimed is:

1. A system comprising:
   a first image system and a second image system, each comprising:
      a front pane;
      a plurality of side panes extending rearward from a perimeter of the front pane;
      a rear extending behind the front pane from at least one of the side panes, wherein the front pane, the plurality of side panes and the rear define an interior space; and
      a respective image disposed at least partially on an interior surface of the front pane; and
   a connection system comprising:
      a first connection portion disposed at the rear of the first image system;
      a second connection portion disposed at the rear of the second image system; and
      a connector that is operable to connect the first image system and the second image system to one another, with the first and second image systems disposed adjacent one another, the connector comprising:
         a first connector portion configured to mate with the first connection portion of the first image system;
         a second connector portion configured to mate with the second connection portion of the second image system; and
         a member extending between the first connector portion and the second connector portion.

2. The system of claim 1, wherein the first connector portion comprises a first projection,
   wherein the second connector portion comprises a second projection,
   wherein the first connection portion comprises a first aperture sized to receive the first projection, and
   wherein the second connection portion comprises a second aperture sized to receive the second projection.

3. The system of claim 2, wherein each of the first projection and the second projection is triangular,
   wherein each of the first and second apertures is triangular, and
   wherein said respective image is printed at least partially on the interior surface of the front pane.

4. An image system comprising:
   a member having a composition that includes clear rigid thermoplastic material, the member comprising:
      a front pane; and
      a plurality of side panes meeting the front pane at respective corners, wherein the front pane and the plurality of side panes define an interior space; and
   an image printed at least partially on a surface of the front pane that faces the interior space.

5. The image system of claim 4, wherein a portion of the image is printed on a surface of at least one of the side panes that faces the interior space.

6. The image system of claim 5, wherein the image extends across at least one of the respective corners.

7. The image system of claim 4, wherein the image extends contiguously across at least one of the respective corners, and
   wherein the member is a unitary piece of said material.

8. The image system of claim 4, wherein the plurality of side panes comprises a first side pane and a second side pane, and
   wherein the member further comprises:
      a first rear pane extending behind the front pane from the first side pane; and
      a second rear pane extending behind the front pane from the second side pane.

9. The image system of claim 8, wherein a secure mounting aperture that comprises a channel is disposed at the first rear pane,
   wherein the channel is curved between a first end of the channel and a second end of the channel,
   wherein the first end of the channel is sized to receive a head of a fastener, and
   wherein the second end of the channel is sized to preclude passage of the head of the fastener.

10. The image system of claim 4, further comprising:
    a rear disposed opposite the front pane; and
    a channel that is disposed at the rear, that comprises a first channel end and a second channel end, and that narrows between the first channel end and the second channel end.

11. The image system of claim 10, further comprising:
    a first receptacle disposed at the rear of the image system; and
    a connector configured to mate with the first receptacle and with a second receptacle of a second image system to connect the image system and the second image system to one another.

12. A method for producing an image system, comprising:
    providing a sheet of clear rigid thermoplastic material that comprises a side;
    printing an image directly on the side of the sheet; and
    forming the sheet to provide a front pane and a plurality of side panes extending from the front pane to define an interior space, with the printed image oriented towards the interior space.

13. The method of claim 12, wherein a first portion of the printed image is disposed on the front pane and a second portion of the printed image is disposed on at least one of the side panes.

14. The method of claim 13, wherein the printed image extends across a corner formed between the front pane and the at least one of the side panes.

15. The method of claim 14, further comprising forming the sheet to provide one or more rear panes extending behind the front pane.

16. The method of claim 15, further comprising providing a receptacle at the one or more rear panes, wherein the receptacle is configured to mate with a connector that is configured to connect the image system to another image system.

17. The method of claim 14, further comprising forming the corner using a forming tool.

18. The method of claim 14, wherein the front pane has a geometry, and
   wherein said forming the sheet comprises:
      while heating selective areas of the sheet, forming the sheet with a tool having a shape corresponding to the geometry.

19. The method of claim 12, wherein the provided sheet comprises a groove in the side,
   wherein the method further comprises dividing the image into a first image portion and a second image portion,
   wherein printing the image comprises printing the first image portion on a first side of the groove and the second image portion on second side of the groove so that the groove comprises a separation between the first image portion and the second image portion, and
   wherein forming the sheet comprises forming a corner at the groove to at least partially close the groove and reduce the separation between the first image portion and the second image portion.

20. The method of claim 19, wherein the printed image extends contiguously across the corner.

* * * * *